Nov. 22, 1966 W. K. BENDER 3,286,571

MARKING DEVICE FOR A SOUND RECORD CARRIER

Filed Sept. 15, 1961

INVENTOR.
WERNER K. BENDER

BY Kane and Nydick

ATTORNEYS

United States Patent Office 3,286,571
Patented Nov. 22, 1966

3,286,571
MARKING DEVICE FOR A SOUND RECORD CARRIER

Werner K. Bender, Plainville, Conn., assignor to The Kalart Company Inc., Plainville, Conn.
Filed Sept. 15, 1961, Ser. No. 138,442
5 Claims. (Cl. 83—272)

Figures 1, 2, 3:
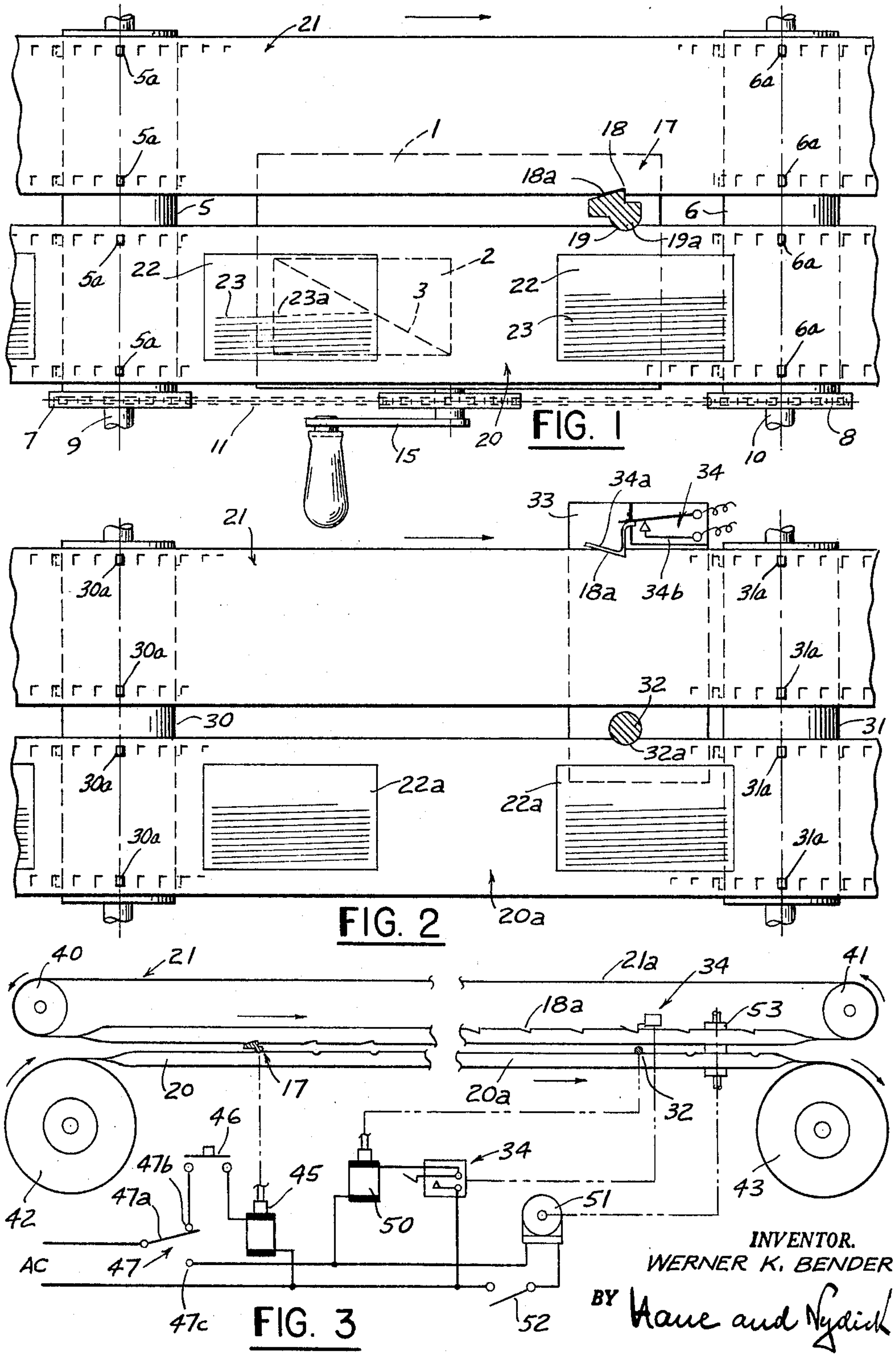

The present invention relates to a method of and a marking device for marking a carrier bearing several programs each comprising a picture area and a sound record area, and more particularly, to a device for marking by notching or punching a strip of film bearing picture areas and sound record areas longitudinally spaced on the strip either in one or two parallel rows.

There are now known strips of film on which are printed or otherwise produced a sequence of programs each comprising a picture area and a sound record area on which is recorded a message pertaining to the picture area of the program. The picture area and the associated sound record area need not to be directly adjacent to each other when disposed in one row and not to be transversely aligned when disposed in two rows. In actual practice, the two associated areas are more often than not separated by one of several areas belonging to other programs. Furthermore, the areas allotted to the pictures and the areas allotted to the sound records need not be alike, either one of the two areas may occupy more space on the strip of film than the other. Each message is recorded on the sound record area allotted to it in the form of parallel track sections slanted in reference to the longitudinal edges of the film. The track sections are so recorded that the end of one section and the beginning of the next adjacent section in the direction of the play-back constitute a continuation of the recorded message. To effect a smooth and continuous transition from one track section to the next one, each track section may have at its end a fade-out portion and at its beginning a fade-in portion. Both the picture and the sound track may be photographically printed and then the sound track is optically scanned, but the sound track may also be magnetically recorded on an appropriately coated record area, or it may be printed with magnetically conductive ink by any of the conventional printing techniques.

Carriers such as lengths or strips of film of the kind above referred to, or rather the programs thereon, are designed to be projected or viewed and reproduced, respectively, by sound projectors in which the carrier is held stationarily during the presentation of a program and is transported into position for the presentation of another program upon completion of the preceding one. The transport mechanism is activated by signal means provided on the carrier and rendered effective when the end of a presentation is reached. The signal means may be of electronic nature such as a recorded frequency signal which is generated when the presentation is completed and which operates appropriate responsive equipment, or the signal means may be of electro-mechanical nature and consist of a physical marking such as a notch or hole in the strip of film, which notch or hole at the end of a presentation is engaged by suitable mechanical or electrical components such as contact fingers. Engagement of the components probing the film for a notch or a hole then activates the transport mechanism of the projector. Applicant has found that physical marking is more accurate and economical, and accordingly the present invention relates to mechanical signal means, and more specifically, to a device for applying markings in the form of notches or holes to the strip of film.

Sound projectors and films of the kind above referred to, are more fully described in co-pending application Serial No. 809,043 filed April 27, 1959, now matured in Patent 3,001,444 issued September 26, 1961.

One of the problems involved in the application of markings to a program carrier such as a strip or length of film is to ascertain the correct locations for such markings. The track recorded on a sound record area may, of course, occupy the entire area allotted to it, but frequently it occupies only a fraction of the available total area and that fraction may be, and often is, different for each area. As a result, the markings cannot be uniformly spaced, but the correct location thereof must be specifically determined for each sound record area. Theoretically, it is possible to determine the correct locations by listening one or several times to each message and then marking the film accordingly. However, such procedure is not feasible for economic reasons. In practice, each strip of film may contain a number of record areas and usually does, and a substantial number of copies of strips containing the same programs may have to be marked. Obviously, the time required for individual marking of each copy and the resulting costs would be prohibitive.

It is a broad object of the present invention to provide a marking device by means of which program carriers of the kind above referred to, can be rapidly and accurately marked in accordance with the lengths of each of the several messages recorded thereon.

It is also a broad object of the invention to provide a novel and improved marking device in which a "pattern carrier" can be marked simultaneously and in accordance with the marking of the original program carrier. The "pattern carrier" thus marked may be a strip of film—waste film being quite suitable—of tape, or of any other suitable strip material. The pattern carrier may then be used for marking copies of the original or master program carrier.

Another broad object of the invention is to provide a novel and improved device for successively marking copies of the original program carrier by means of the aforedescribed pattern carrier. Each of the program copies will be automatically marked in conformity with the markings on the original program carrier. The pattern carrier may travel in the device from a supply reel to a take-up reel during the marking of copies, or it may be fed out from a cartridge and returned into the same, or it may be arranged in the form of an endless loop.

A more specific object of the invention is to arrange the just described marking device in a manner such that the marking of the original program carrier, the pattern carrier and copies of the program carrier may be effected in successive operation thereby greatly expediting the readying of the copies for projection and sound reproduction.

While the invention primarily relates to the marking of program carriers bearing picture areas and sound record areas, it should be understood that the invention may also be advantageously used in connection with program carriers bearing sound record areas or picture areas only.

Other and further objects, features and advantages of the invention may be pointed out hereinafter and set forth in the appended claims constituting part of the application.

In the accompanying drawing several preferred embodiments of the invention are shown by way of illustration and not by way of limitation.

In the drawing:

FIG. 1 is a plan view, partly in section, of a device for simultaneously marking an original or master program carrier and a pattern carrier.

FIG. 2 is a plan view, partly in section, of a device for marking one or several copies of the original program carrier in accordance with the markings on the pattern carrier, and FIG. 3 is a diagrammatic view of an apparatus for simultaneously marking an original program carrier and a pattern carrier and for marking copies of the original program carrier in accordance with the markings on the pattern carrier in successive operation.

Referring first to FIG. 1 in detail, the marking device is shown to the extent only that is essential for the understanding of the invention. The device comprises a stationarily mounted base plate 1 which includes a window 2 covered with a suitable translucent or transparent material and crossed by a diagonal indexing or reference line 3. The window may be illuminated from below to facilitate observation of line 3. Line 3 may, of course, also be formed by a thin wire stretched across an open window. The marking device further comprises two pairs of sprockets 5 and 6 having teeth 5*a* and 6*a* respectively and being seated on common shafts 9 and 10 respectively and coupled by suitable transmission means shown as gears 7 and 8 fixedly mounted on shafts 9 and 10 respectively and a chain drive 11. The two sprockets of each pair are coupled to each other. Both pairs of sprockets may be driven at a synchronous rate of speed by means of a hand crank 15, but a motor drive may of course also be provided.

The marking device also comprises a cutting means 17 shown as a punch. Punch 17 is formed with two punching portions 18 and 19. Cutting portion 18 has preferably a pointed shape and serves to punch the master or pattern carrier and cutting portion 19 is semicircular and serves to punch the original program carrier as will be more fully explained hereinafter. It would, of course, be possible and it is within the concept of the invention to provide different shapes for the cutting portions of the punch, but it has been found that the shape of the punch as shown produces particularly advantageous results. Generally, the pointed shape of the punch used for punching the pattern carrier produces a more definite signal than would be obtained with a rounded marking in the pattern carrier. The punch is stationarily mounted on base plate 1, or in any other suitable manner. The location of the punch in reference to indexing line 3 and the operation of the punch will be more fully explained hereinafter.

The two pairs of sprockets 5 and 6 serve to guide and transport a program carrier 20 and a pattern carrier 21 parallel to each other and in a common plane. As previously explained, the program carrier consists of a strip of film on which are recorded several longitudinally spaced sound record areas 22. The sound record areas should be visualized as being interspersed with photographically printed picture areas which are not shown as they are not essential for the understanding of the invention. Each sound record area is occupied by a plurality of parallel sound track sections 23 shown as being slightly inclined in reference to the longitudinal edges of the strip of film. As is evident from a comparison of the illustrated sound record areas, the portion occupied by the sound track sections is different for each sound record area 22. In other words, the lengths of the messages as represented by the sound track sections 23 varies. Of course, it is also conceivable that the sound track sections occupy the same portion of each sound track area.

The marking device according to FIG. 1 functions as follows:

Let is be assumed that the program strip 20 and the pattern strip 21 are inserted in the device by placing the same upon the sprockets in any arbitrary relationship in reference to each other. The sound record area 22 first to be marked is now moved into a position such that the sound track sections 23 thereon approximately overlie window 2 and indexing line 3 thereof by turning crank 15. The fine adjustment is thereupon effected by moving the respective sound track areas so that an extrapolation (shown in dotted lines) of the incomplete last track section 23*a* just intersects indexing line 3. This position is shown in FIG. 1. In some instances it is sufficient to set the index line for the last complete sound track section, especially if there is a short incomplete uppermost sound track section. The accuracy of the setting is then not quite as great as in the example shown since the last incomplete track section is neglected, but it is sufficient in many instances and the setting is somewhat more convenient.

Upon completion of the setting, punch 17 is activated in a suitable manner and the punch will punch an approximately semi-circular notch 19*a* in program strip 20 and a generally V-shaped notch 18*a* in pattern strip 21. The notches may, of course, also be produced by a tool, such as a cutting wheel.

The aforedescribed setting and punching is repeated for each sound track area on program strip 20. As is evident, the final result is a program strip 20 marked with marginal notches 19*a*, each of which is spatially related to a specific sound record area, and pattern 21 is notched with a corresponding number of notches 18*a* the longitudinal spacing of which corresponds to that of notches 19*a*. As is further evident, the location of each notch 19*a* in reference to the respective sound record area is indicative of the length of the message recorded thereon.

As has been previously explained, the marginal notches of the program strip serve to activate the transport means of the sound projector, as described in copending application 809,043, upon completion of a program.

The pattern strip 21 may now be used to mark any desired number of copies of program strip 20. FIG. 2 shows a device suitable for that purpose. There are shown two coupled pairs of sprockets 30 and 31 having teeth 30*a* and 31*a*, respectively, upon which are placed a notched pattern strip 21*a* and a photographic copy 20*a* of program strip 20. Sprockets 30 and 31 should be visualized as being drivingly connected to suitable drive means which may either be manual drive means or power drive means for driving both pairs of sprockets at a synchronous rate of speed. The device according to FIG. 2 further comprises cutting means 32 shown as a punch of preferably circular cross-section. The punch may be stationarily mounted on a base plate 33 which further mounts a switch 34 having a movable contact finger 34*a* and a stationary contact 34*b*. Switch 34 may, of course, also be mounted on a separate support.

Notched pattern strip 21*a* must be placed on the sprockets in a position such that the notches 18*a* face outwardly in reference to the copy 20*a* of the program strip. The copy of the program strip is placed in a position such that a selected notch 18*a* of pattern strip 21*a* is at the appropriate spatial distance from the corresponding sound record area on copy 20*a* as established by means of the device according to FIG. 1 for the original strip 20. In other words, the initial spatial relationship between strips 21*a* and 20*a* should be such that when punch 32 is activated, the notch 32*a* punched in strip 20*a* is in the correct position for the associated sound record area.

After such initial adjustment of the strips in reference to each other, both strips may be driven as previously described. During such driving, contact finger 34*a* of switch 34 will ride along the upper edge (as shown in FIG. 2) of strip 21*a*, thus holding open the switch. When now a notch 18*a* passes under contact finger 34*a*, the contact finger will drop into the notch thereby closing the switch at contact 34*b*. Closing of the switch operates an energizing circuit for punch 32, as will be more fully described hereinafter. Accordingly, each notch in pattern strip 21*a* causes punching of a notch 32*a* in strip 20*a* at a location corresponding to the location of the respective notch in strip 21*a*. Hence all the notches punched in strip 20*a* will bear the same relationship to the respective sound record areas as do notches 19*a* punched in the original or master program carrier 20.

To simplify the illustration, only one copy 20*a* is shown as being marked during one cycle of the marking device according to FIG. 2. However, as is evident, several copies of program strips 20*a* may be simultaneously punched by providing more than two sprockets 30 and 31, respectively, on a common shaft and by providing a corresponding number of punches 32, each operated when contact finger 34*a* engages a notch 18*a* of strip 21*a*. As indicated before, pattern strip 21*a* may be transported by winding the strip from a supply reel upon a take-up reel, or by feeding the strip out of a cartridge and returning the strip into the cartridge, or operating the strip as an endless loop. Arrangements of this kind may be readily visualized and also are well known in the art though not for the same purpose.

FIG. 3 shows an arrangement in which the marking functions of the marking devices according to FIGS. 1 and 2 are combined; FIG. 3 also shows a circuit diagram for controlling the cutting means 17 and 32. Corresponding components are indicated in FIG. 3 by the same reference numerals. The upper left-hand part and the notching of a copy 20*a* of strip 20 by means of notched pattern strip 21*a* are shown in the upper right-hand part of the figure. The drive for all the strips is derived from a motor 51 connected through a manually operable switch 52 to a source of current. The motor drives the strips by means of sprockets 53. Pattern strip 21 is guided by means of guide rollers or sprockets 40 and 41, and program strip 20 and also copies 20*a* thereof are guided by means of guide rollers or sprockets 42 and 43. As is evident from the previous description, strips 20, 21 and 21*a*, 20*a* respectively are driven at a synchronous rate of speed.

Referring first to the simultaneous marking of original or master program strip 20 and pattern strip 21, the punch 17 used for this operation is operated by means of a solenoid 45, the energizing circuit of which is controlled by means of a normally open push-button switch 46. The energizing circuit for solenoid 45 further includes a switch 47. This switch has a movable contact arm 47*a* which may be placed either in engagement with a contact 47*b* or a contact 47*c*. When contact arm 47*a* engages contact 47*b* as shown, closing of push-button 46 energizes solenoid 45, thereby operating punch 17. Push-button 46 is operated each time a sound record area on the program strip has been adjusted in reference to indexing line 3 as described in connection with FIG. 1.

Assuming now that the simultaneous notching of the original program strip 20 and the marking of the pattern strip is completed, the device is stopped. The notched pattern strip is then removed and reinserted in reverse position as described in connection with FIG. 2. The right-hand side of FIG. 3 shows the notched pattern strip 21*a* in its reversed position. The marked original program strip is also removed and replaced by a copy 20*a* to be marked in accordance with the notches in pattern strip 21*a*. Furthermore, switch 47 is moved into the position in which contact 47*c* is engaged. A solenoid 50 for operation of punch 32 is now connected through switch 34 to current.

Motor switch 52 is initially left open for manual positioning of the notched pattern strip 21*a* and the copy 20*a* to be notched in reference to each other as has been described in connection with FIG. 2. Upon completion of such positioning switch 52 is closed and the marking of copy 20*a* will now be effected automatically. Again it may be mentioned that several copies may be marked simultaneously under the control of a single pattern strip.

The copies to be marked may be fed to the marking means directly from a printing machine such as described in copending application Serial No. 30,314 filed May 19, 1960, now matured in Patent 3,094,057 issued June 18, 1963, and after completion of the marking the marked copies may be fed into a cutting device which cuts the same in sections of suitable length and also readies the cut sections for storage. Means suitable for that purpose are described in copending application Serial No. 87,927 filed February 8, 1961, now Patent No. 3,148,573, granted Sept. 15, 1964.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A marking device for simultaneously marking a pattern carrier and a program carrier carrying several lengthwise aligned sound record areas each including parallel sound track sections, said device comprising guide means for guiding both said carriers parallel to each other along parallel paths, drive means operable for moving both carriers in the same direction at a synchronous rate of speed, and marking means for simultaneously marking both carriers, said marking means including cutting means stationarily disposed adjacent to both said carriers and operable to cut markings simultaneously in both said carriers, stationarily disposed indexing means co-acting with the program carrier for placing the sound track sections on successive sound record areas thereof in a predetermined position in reference to the indexing means, and means for operating said cutting means whereby the locations of the markings on both carriers are indicative of the sound track sections of successive sound record areas on the program carrier.

2. A marking device according to claim 1, wherein said indexing means include a reference line and the spatial relationship of the reference line and the cutting means is such that upon placing the track sections of any selected sound record area in said predetermined position relative to the reference line, said spatial relationship is indicative of the area portion occupied by the sound track sections on the respective sound record area.

3. A marking device according to claim 1, wherein both said carriers are in the form of strips, said guide means guiding said strips in a common plane, and wherein said cutting means is disposed intermediate the adjacent longitudinal edges of said strips and includes cutting portions engageable with both said carriers to cut a marginal notch in the respective edge of each of the carriers upon operation of the cutting means.

4. A marking device, according to claim 3, wherein the cutting portion of the cutting means engageable with the pattern strip is generally V-shaped and positioned to cut a generally V-shaped notch in the respective edge of the pattern strip.

5. A marking device according to claim 1, wherein said guide means comprises two pairs of sprocket rollers for guiding said carriers parallel to each other in a common plane, the rollers of each pair being coupled with each other and the two pairs being coupled with each other, said drive means being drivingly connected to said rollers for driving all said rollers at the synchronous rate of speed, and wherein said indexing means are disposed to extend across the path of travel of the program carrier in a plane parallel to said path and includes a reference line for placing the sound track sections of successive sound record areas in said predetermined position in respect to said reference line.

References Cited by the Examiner

UNITED STATES PATENTS

| | | | |
|---|---|---|---|
| 1,221,881 | 4/1915 | Lysholm | 83—412 |
| 1,494,593 | 5/1924 | Depue | 83—71 |
| 1,821,460 | 9/1931 | Cheshire | 83—412 |

(Other references on following page)

UNITED STATES PATENTS

| | | | |
|---|---|---|---|
| 1,859,091 | 5/1932 | Hoxie | 83—71 |
| 1,994,913 | 3/1935 | Howell | 83—520 |
| 2,136,143 | 11/1938 | Michaelis | 274—41.6 |
| 2,307,617 | 1/1943 | Braun | 83—33 |
| 2,458,538 | 1/1949 | Socke | 83—33 |
| 2,613,744 | 10/1952 | Hillmer et al. | 83—520 |
| 2,657,932 | 11/1953 | Blaney | 274—41.6 |
| 2,783,842 | 3/1957 | Mainardi et al. | 83—520 |
| 2,815,811 | 12/1957 | Feiertag | 82—917 |

WILLIAM S. LAWSON, *Primary Examiner.*

CARL W. TOMLIN, HUNTER C. BOURNE, Jr., LEON PEAR, *Examiners.*

O. J. MURRAY, J. B. McGUIRE, *Assistant Examiners.*